US010815068B2

(12) United States Patent
Daboub

(10) Patent No.: US 10,815,068 B2
(45) Date of Patent: Oct. 27, 2020

(54) AUTOMATED PARCEL SINGULATOR

(71) Applicant: National Presort, Inc., Fort Worth, TX (US)

(72) Inventor: Brent Daboub, Fort Worth, TX (US)

(73) Assignee: National Presort, L.P., Fort Worth, TX (US)

(*) Notice: Subject to any disclaimer, the term of this patent is extended or adjusted under 35 U.S.C. 154(b) by 0 days.

(21) Appl. No.: 16/108,895

(22) Filed: Aug. 22, 2018

(65) Prior Publication Data

US 2018/0362263 A1 Dec. 20, 2018

(51) Int. Cl.
B65G 47/24 (2006.01)
B65G 47/14 (2006.01)
B65G 43/08 (2006.01)
G06K 7/10 (2006.01)
B65G 47/68 (2006.01)

(52) U.S. Cl.
CPC ......... B65G 43/08 (2013.01); B65G 47/1492 (2013.01); B65G 47/24 (2013.01); B65G 47/68 (2013.01); B65G 47/682 (2013.01); G06K 7/10 (2013.01)

(58) Field of Classification Search
CPC ........ B65G 43/08; B65G 47/24; B65G 47/52; B65G 47/68; B65G 47/682; B65G 47/1492; G06K 7/10
USPC ........................................................ 209/539
See application file for complete search history.

(56) References Cited

U.S. PATENT DOCUMENTS

| 3,604,551 | A | | 9/1971 | Fink |
| 5,092,451 | A | | 3/1992 | Jones et al. |
| 5,154,246 | A | * | 10/1992 | DiGiulio ............... A61K 31/16 177/25.15 |
| 5,638,938 | A | * | 6/1997 | Lazzarotti ............... B07C 1/02 198/358 |
| 5,740,901 | A | | 4/1998 | Lazzarotti et al. |
| 5,950,800 | A | | 9/1999 | Terrell et al. |
| 6,259,967 | B1 | | 7/2001 | Hartlepp et al. |
| 6,401,936 | B1 | * | 6/2002 | Isaacs .................... B65G 43/08 198/367.1 |
| 6,497,321 | B2 | | 12/2002 | Horton et al. |
| 7,861,847 | B2 | | 1/2011 | Fourney et al. |
| 2016/0221762 | A1 | * | 8/2016 | Schroader ............. B65G 43/08 |

OTHER PUBLICATIONS

International Search Report and Written Opinion of International Searching Authority dated Nov. 19, 2019 corresponding to International Application No. PCT/US19/47662.

* cited by examiner

Primary Examiner — Terrell H Matthews
(74) Attorney, Agent, or Firm — James E. Walton

(57) ABSTRACT

An automated parcel singulator includes a conveyor system, a control and monitoring system, an infeed table, and a hopper system. The hopper system stores and dispenses parcels and boxes onto the infeed table. The infeed tables singulates and moves the boxes and parcels, so that when the boxes and parcels are placed on the conveyor system they form a single line of packages.

11 Claims, 10 Drawing Sheets

AUTOMATED PARCEL SINGULATOR

BACKGROUND

1. Technical Field

The present application relates to parcel singulator assemblies for singulating articles, such as letters, flats, parcels, and polybags, along conveyor systems to be processed by automatic sorting machines.

2. Description of Related Art

Automated sorting systems for sorting articles, such as letters, flats, parcels, and polybags, have been around for many years. These automated systems typically include a hopper assembly, some sort of "singulation" system, an infeed system, and an automated sorting machine. The hopper assembly is used to introduce randomly sized and shaped articles into the system. The singulation system is used to singulate and space the articles along a conveyor prior to entry into the infeed system. The infeed system automatically senses and procures data about the individual articles, including physical information, such as dimensions and weight; delivery information, such as delivery time and destination; and other data that can be sensed by various automated sensors, cameras, and detectors. Infeed systems may also include gapping belts and various other belts, rollers, ramps, pushers, walls, and redirection devices to realign the articles and prevent the articles from overlapping each other prior to entry into the automated sorting machine. The automated sorting machine is a high-speed, continuous-feed, processing machine that utilizes the data from the infeed system to sort and route the articles into selected bins and compartments for later processing.

These automated sorting machines are very complicated and operate at very high speeds. Because these machines operate at such high speeds, it is important that the articles be organized into a single line with minimal gaps between articles. The larger the gaps between articles, the less efficient the sorting machine operates. This process of aligning the articles into a single line with minimal gaps is referred to in the parcel-sorting industry as "singulation."

Historically, the singulation operation was performed by one or more human operators stationed near the hopper. As the articles moved from the hopper toward the infeed system, the human operators would manually move the articles about to arrange the articles in a single line on the conveyor. It is not unexpected that the human operators have not been able to keep up with the increased speeds of the sorting machines. As a result, automated singulation systems have been developed to automatically singulate and arrange the articles on the conveyor prior to introduction into the infeed systems. However, these automated singulation systems require a large network of ramps, conveyors, rollers, gapping belts, and redirectors to move the articles and singulate the articles for introduction into the infeed systems.

BRIEF DESCRIPTION OF THE DRAWINGS

The novel features believed a characteristic of the system of the present application is set forth in the present application. However, the system itself, as well as a preferred mode of use, and further objectives and advantages thereof, will best be understood by reference to the following detailed description when read in conjunction with the accompanying drawings, wherein.

Figure 1:
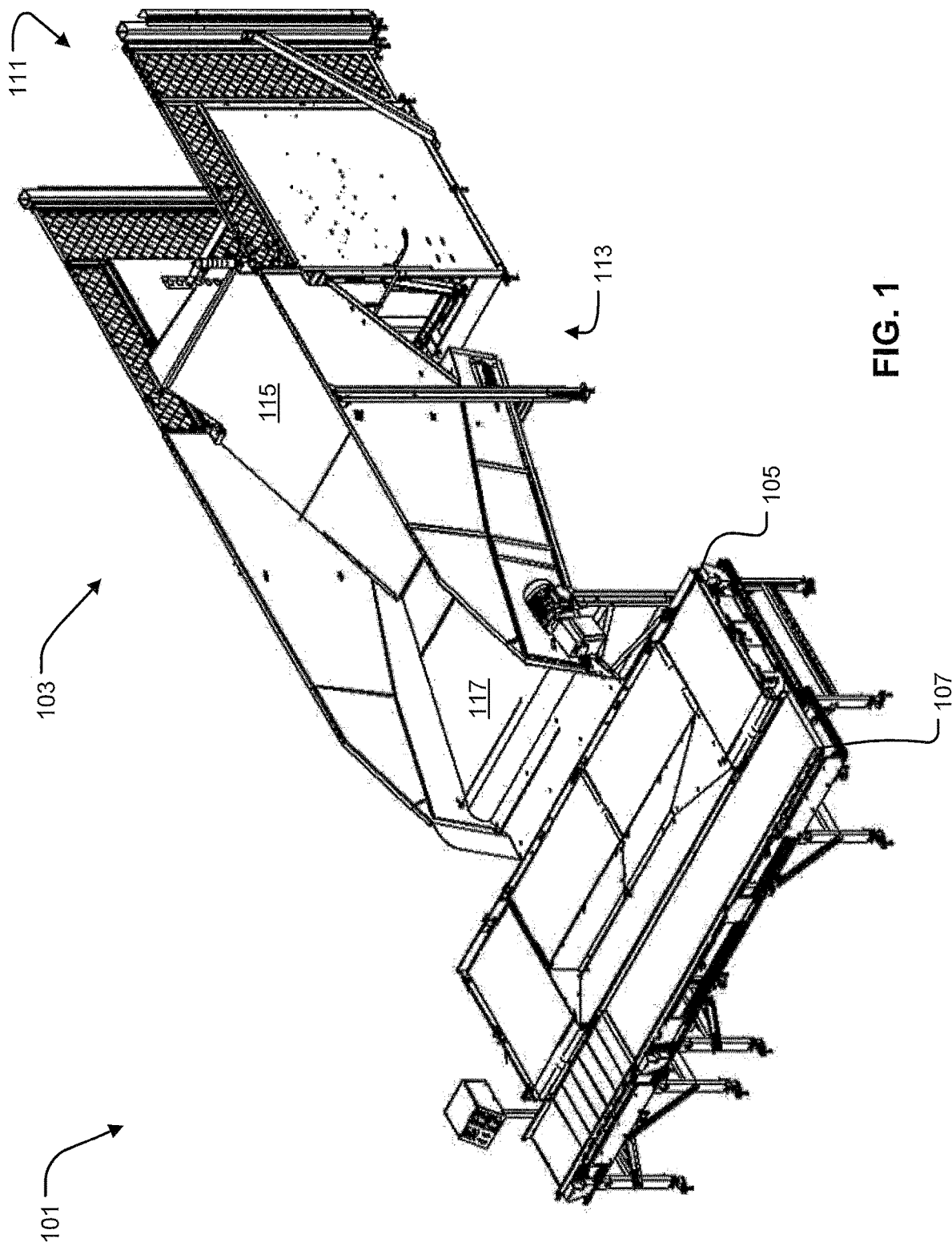
FIG. 1 is a general view of the preferred embodiment of an automated parcel singulator according to the present application.
Figure 2A:
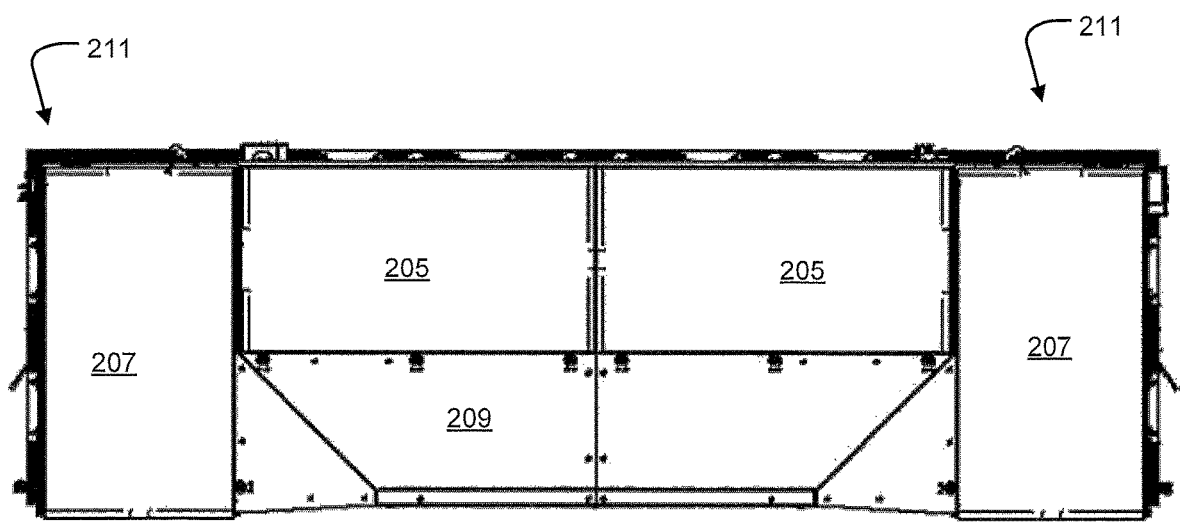
FIG. 2A is a top view of an infeed table of an automated parcel singulator according to the present application.
Figure 2B:
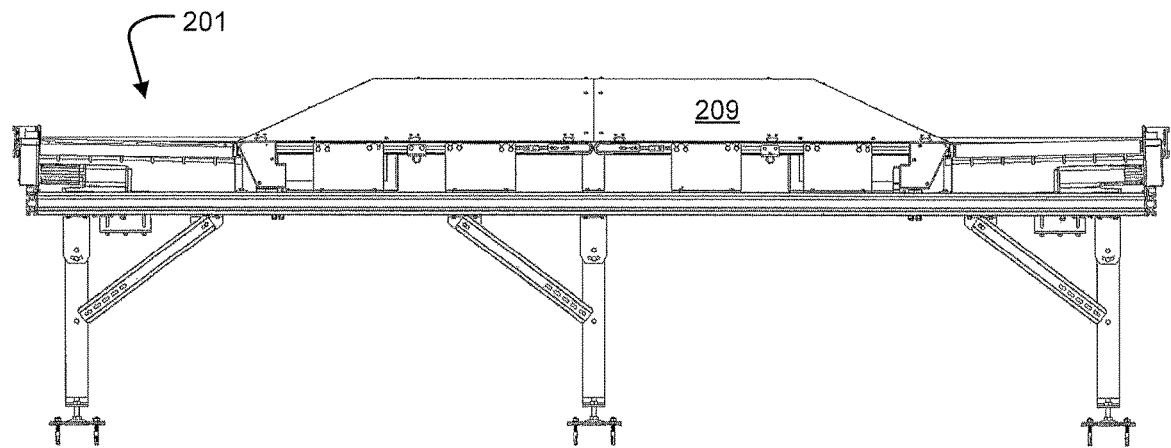
FIG. 2B is a front view of an infeed table of an automated parcel singulator according to the present application.
Figure 2C:
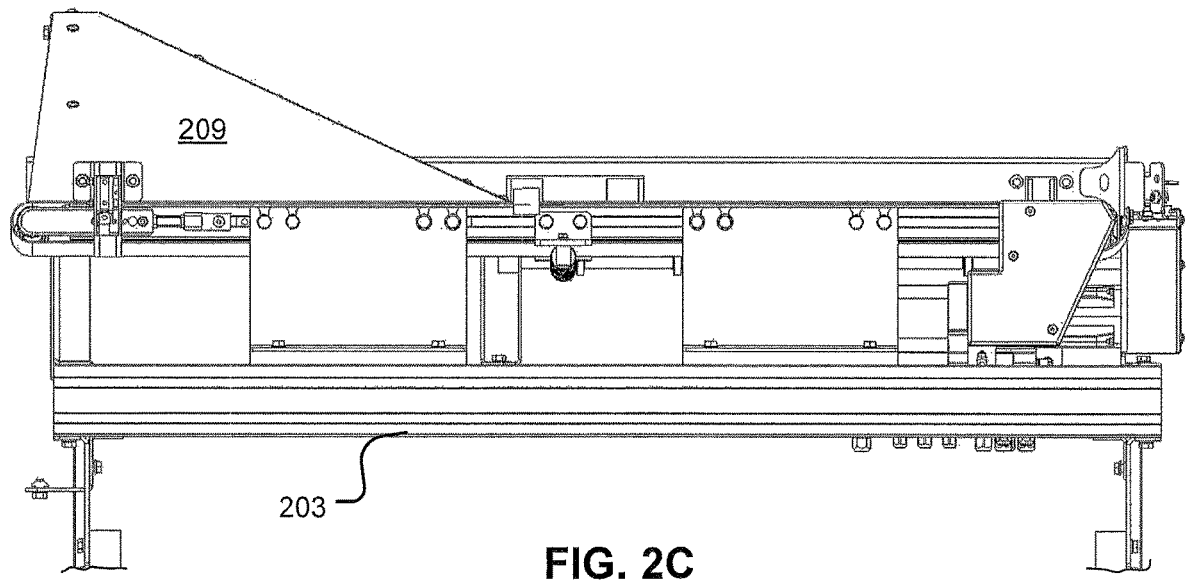
FIG. 2C is a side view of an infeed table of an automated parcel singulator according to the present application.
Figure 2D:
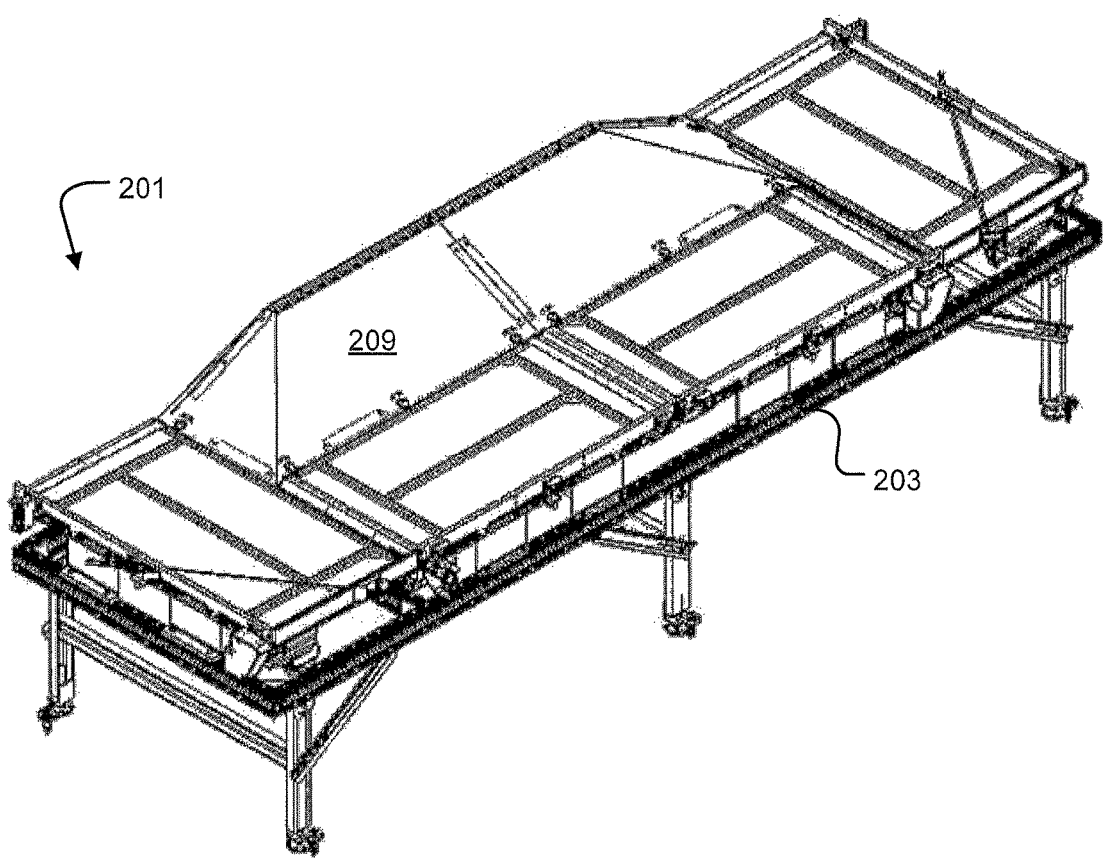
FIG. 2D is a perspective view of an infeed table of an automated parcel singulator without belts according to the present application.
Figure 2E:
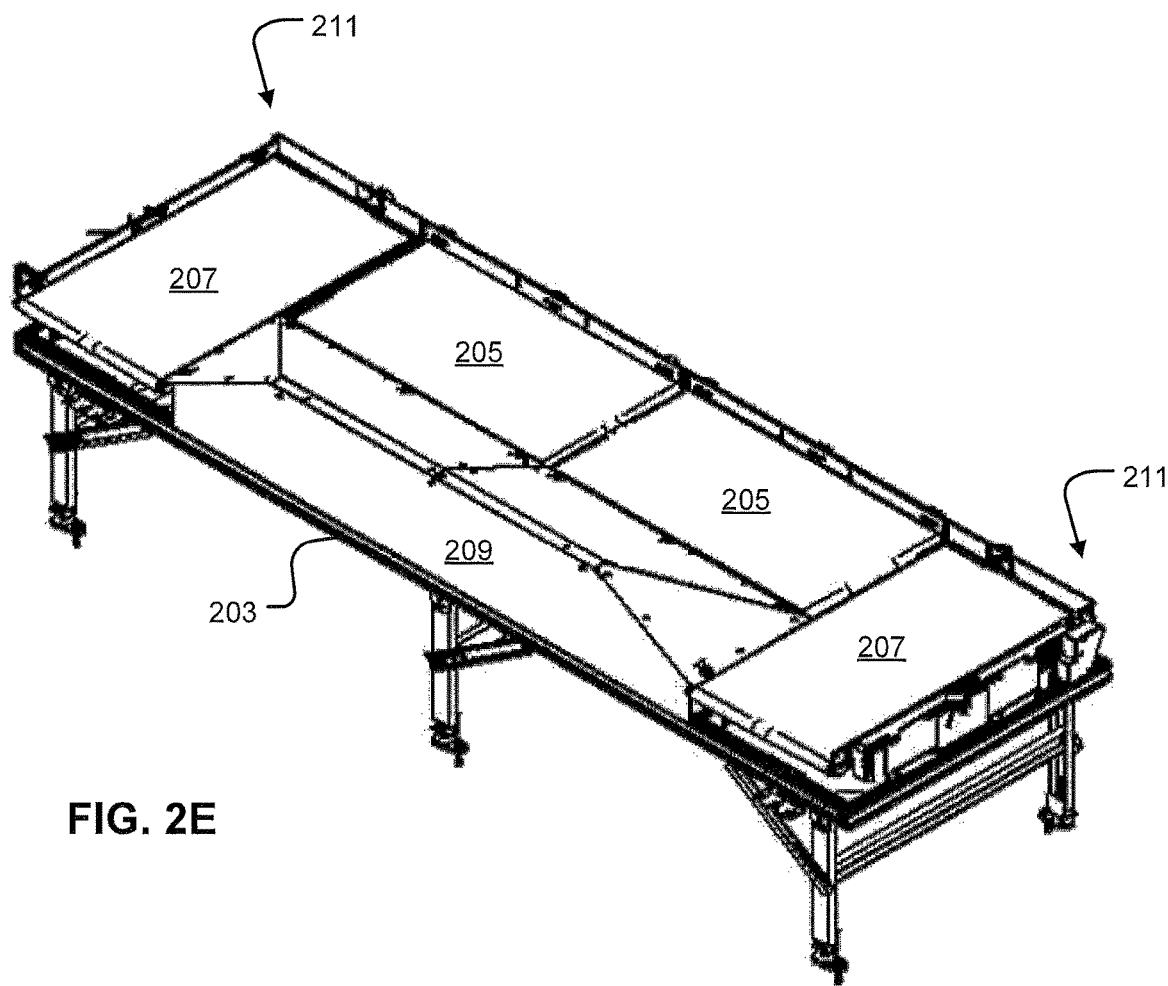
FIG. 2E is a perspective view of an infeed table of an automated parcel singulator according to the present application.
Figure 2F:
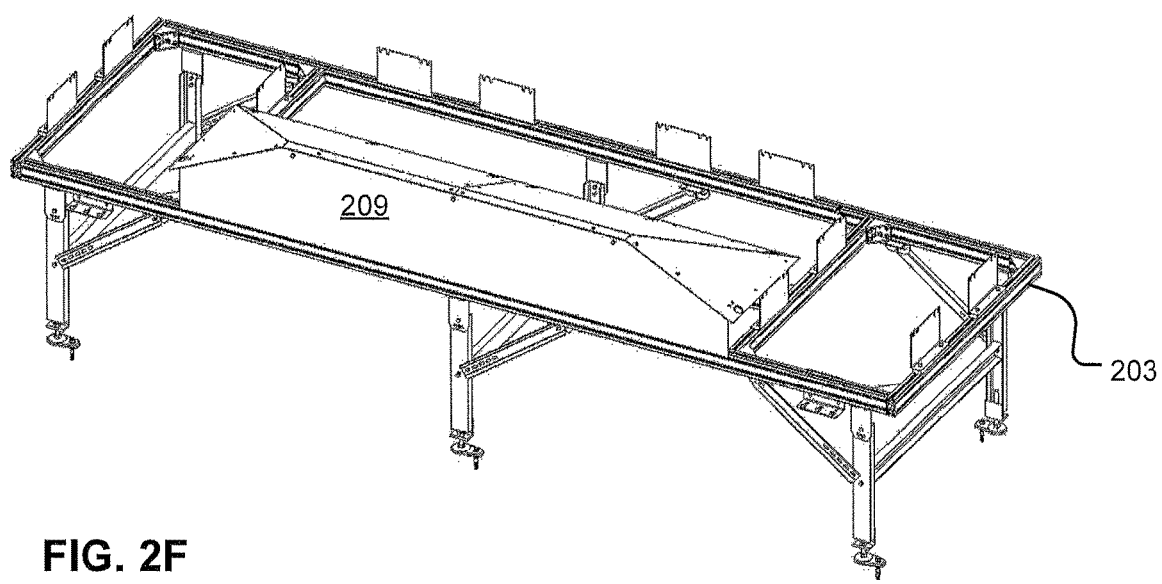
FIG. 2F is a perspective view of an infeed table, without belts, of an automated parcel singulator according to the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, combinations, and alternatives falling within the spirit and scope of the present application.

DETAILED DESCRIPTION OF THE PREFERRED EMBODIMENT

Illustrative embodiments of the system of automated parcel singulator the present application are described below. In the interest of clarity, not all features of an actual implementation are described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. Additionally, "package," "parcel," "box," and other such terms are used interchangeably herein.

Referring now to FIG. 1 in the drawings, the preferred embodiment of an automated parcel singulator 101 according to the present application is illustrated. Automated parcel singulator 101 is comprised of a hopper system 103, an infeed table 105, and a conveyor system 107. Hopper system 103 is configured to store a plurality of boxes and packages that need to be inserted into an automatic sorting machine. Singulating the boxes and packages into a single stream is necessary for the functionality of the sorting system. Additionally, keeping the gaps between the boxes and packages to a minimum increases the speed and efficiency of the sorting system. Hopper system 103 is comprised of a lift system 111 that supplies boxes to a belt-assisted hopper 113. Boxes and packages are loaded into the lift system 111 and raised above the hopper 113 to fill the hopper 113. Packages slide down a ramp 115 and are deposited onto a belt 117 that feeds boxes and packages to the infeed table 105. Belt 117 is preferably has a width of 60 inches to feed a plurality of boxes into the infeed table.

The infeed table 105 is comprised of at least a first controller and a plurality of sensors arrayed along a plurality of conveyor belts positioned alongside a wedge. The infeed table 105 utilizes the controller along with the sensors to control the plurality of conveyor belts. The controller determines the size and alignment of the boxes and packages from the hopper system 103 and moves each and every belt on the infeed table to position the boxes so that a single stream of singulated boxes are placed on the conveyor system 107. A human may be utilized to face and clean up any double feeds. The system is configured to reduce the amount of human interaction required to face the boxes. Boxes and packages located on linear conveyor system 107 can then be conveyed into automatic mail sorting machines, automatic labelers, and/or other systems for moving and distributing boxes, flats, mailer, packages, etc. While in the preferred embodiment the first controller operates the entire infeed table, other embodiments feature several additional controllers working in harmony to operate the infeed table. It will be appreciated that the first controller, as well as any additional controllers, may be programmable and be located at any location on automated parcel singulator 101, such as a control station, or may be located remote from automated parcel singulate 101.

Referring now also to FIGS. 2A-2F, various views of an infeed table are illustrated. Infeed table 201 is comprised of a frame 203 supporting a first pair of conveyors 205, a second pair of conveyors 207, and a wedge 209. Typically, each of the conveyors of the first and second pair of conveyors are 8 about feet or less in length, resulting in a compact sized infeed table. This compact size is important, as many prior-art singulation systems require many different conveyors and other components spread out over a large space. Packages are supplied to the infeed table 201 from the hopper system onto the first pair of conveyors 205. The first pair of conveyors is located between the wedge 209 and the hopper system. Each belt of the first pair of conveyors is independently controllable and bi-directional to allow packages to move both ways generally parallel to the wedge 209. Wedge 209 is configured to assist packages onto the first pair of conveyors 205 with a beveled plane angled relative to the first pair of conveyors. Packages that are deposited onto the infeed table are either placed directly on the first pair of conveyors 205 or onto the wedge 209 that helps packages slide back onto the first pair of conveyors. Sensors located adjacent to the first pair of conveyors 205 along the frame are utilized by the controller to determine position, alignment, and length of boxes on each of the first pair of conveyors. Typically the sensors are infrared beam emitters and detectors that detect the presence and absence of packages as they proceed along the system. Other sensors are contemplated by this application, such as digital cameras, strain gages, accelerometers, and laser-based sensors.

Packages are placed onto one of the second pair of conveyors 207 from the first pair of conveyors 205. Each belt of the second pair of conveyors is independently controllable but unidirectional to only move packages onto the conveyor system 107. Sensors located adjacent to the second pair of conveyors 207 along the frame are utilized by the controller to determine position, alignment, and length of boxes on each of the second pair of conveyors. Typically the sensors are infrared beam emitters and detectors that detect the presence and absence of packages as they proceed along the system. Other sensors are contemplated by this application, such as digital cameras, strain gages, accelerometers, and laser-based sensors. Each conveyor of the second pair of conveyors 207 is rotated relative, preferably 90 degrees, to the first pair of conveyors 205 to form corners 211. It will be appreciated that although the preferred orientation of the conveyors is approximately perpendicular, other angular orientations may be desired in certain applications. Therefore, as the package is ejected onto the second pair of conveyors 207 from the first pair of conveyors 205 the package is generally forced to be flat along the frame of the second pair of conveyors 207 and therefore is placed on the conveyor system 107 squared up.

Figure 3A:
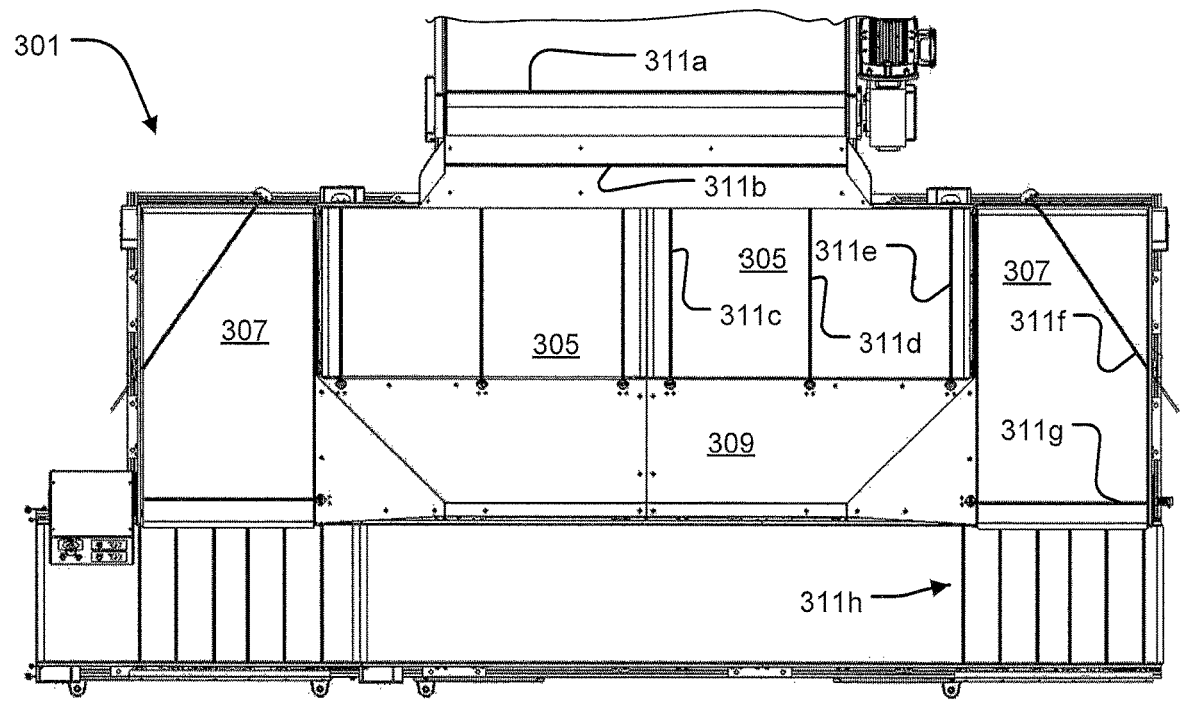
FIG. 3A is a partial top view of an infeed table of an automated parcel singulator illustrating sensor paths according to the present application.
Figure 3B:
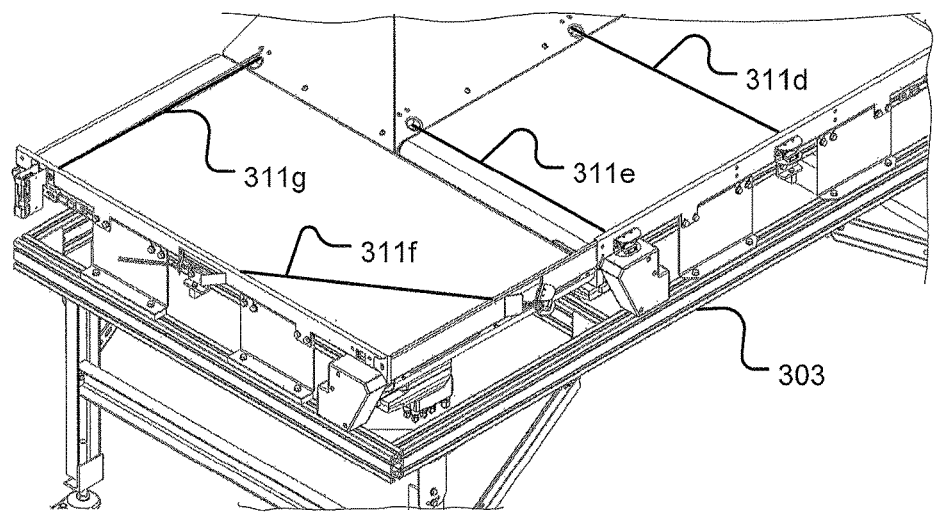
FIG. 3B is a partial perspective view of an infeed table of an automated parcel singulator illustrating sensor paths according to the present application.
Figure 3C:
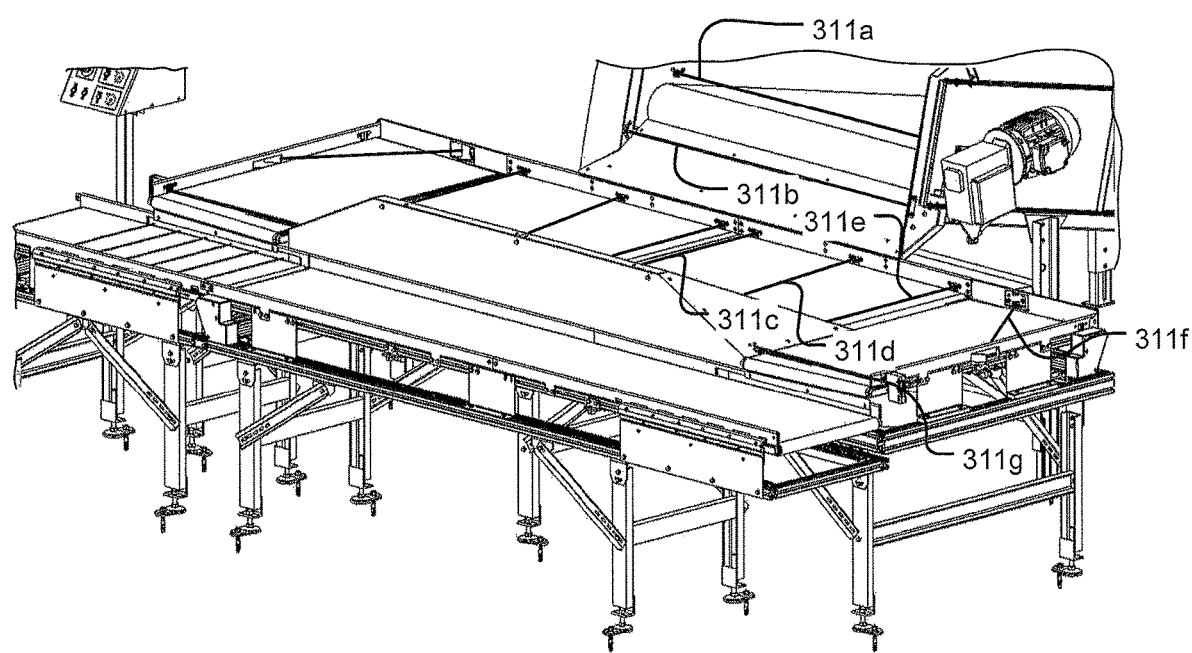
FIG. 3C is a partial perspective view of an infeed table of an automated parcel singulator illustrating sensor paths according to the present application.

Referring now also to FIGS. 3A-3C, various views of an infeed table are illustrated. Infeed table 301 is comprised of a frame 303 supporting a first pair of conveyors 305, a second pair of conveyors 307, and a wedge 309. FIG. 3A illustrates a plurality of light beam sensors 311 located before, during, and after the infeed table. First sensor 311$a$ is located just before a package would drop off of the belt of the hopper. Second sensor 311$b$ is located just after a package would drop off of the belt of the hopper. Third sensor 311$c$ is located at a first end of a belt of one of the first pair of conveyors 305. Fourth sensor 311$d$ bisects one belt of the first pair of conveyors 305. Fifth sensor 311$e$ is located at a second end of a belt of one of the first pair of conveyors 305. Sixth sensor 311$f$ is located from one side of a belt to an adjacent side of one of the second pair of conveyors 307. Seventh sensor 311$g$ is located at a first end of a belt of one of the second pair of conveyors 307. Furthermore, eighth sensor 311$h$ is located adjacent the exit of the exit path, adjacent an interface between the second conveyor and the infeed conveyor system, of the second pair of conveyors 307. Eighth sensor 311$h$ is comprised of a plurality of sensors spaced, typically an inch or two, and enables the controller to determine a width of an opening along the conveyor system 107, so that the infeed table 301 can insert the measured boxes into the opening. Packages are moved from the second pair of conveyors 207 when an appropriate gap size is detected upstream on the infeed conveyor system 107. The second pair of conveyors can be configured to inject packages with a standard conveyor start and stop motion to move the package off of one of the second pair of conveyors 207 on to the infeed conveyors. Additionally the second pair of conveyors 207 can be configured to inject packages using a forward move that has and oscillating speed. Such a move would consist of an oscillating periods of acceleration and deceleration. While only one side of the infeed table has been described, it should be apparent that the other side is a mirror image of the described portion.

FIGS. 3B and 3C illustrate an elevation change, or a first drop, between the hopper assembly and the first pair of conveyors 305. Furthermore, an elevation change, or second drop, is located between the first pair of conveyors 305 and the second pair of conveyors 307. Additionally, an elevation change, or third drop, is located between the second pair of conveyors 307 and the conveyor system 107.

Figure 4:
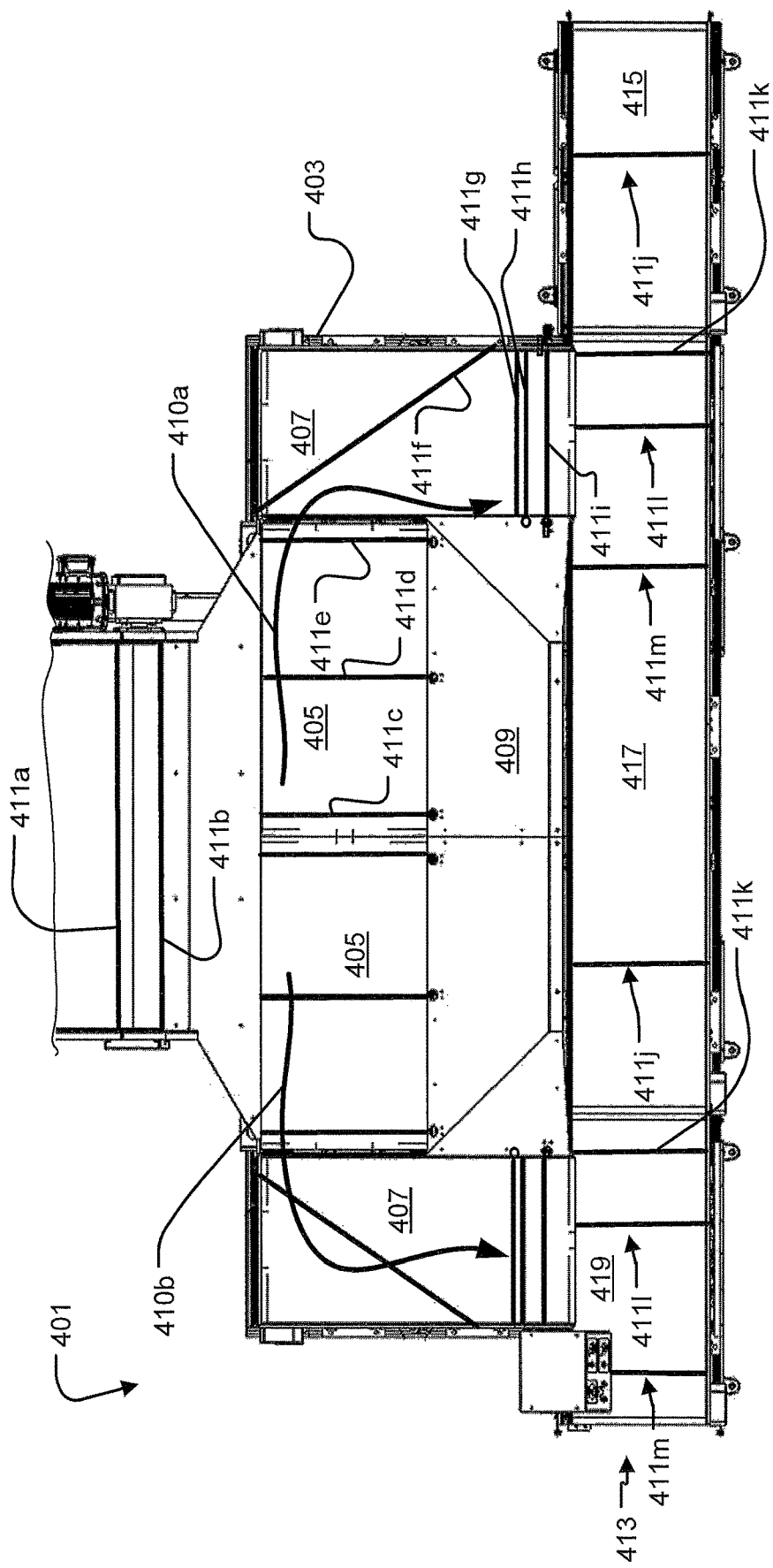
FIG. 4 is a partial top view of an infeed table of an automated parcel singulator illustrating sensor paths according to the present application.

Referring now also to FIG. 4, a partial top view of an infeed table is illustrated. Alternative infeed table 401 is comprised of a frame 403 supporting a first pair of conveyors 405, a second pair of conveyors 407, and a wedge 409. Infeed table 401 features a first output path 410*a* and a second output path 410*b*. FIG. 4 illustrates a plurality of light beam sensors 411 located before, during, and after the infeed table. First sensor 411*a* is located just before a package would drop off of the belt of the hopper. Second sensor 411*b* is located just after a package would drop off of the belt of the hopper. Third sensor 411*c* is located at a first end of a belt of one of the first pair of conveyors 405. Fourth sensor 411*d* bisects one belt of the first pair of conveyors 405. Fifth sensor 411*e* is located at a second end of a belt of one of the first pair of conveyors 405. Sixth sensor 411*f* is located from one side of a belt to an adjacent side of one of the second pair of conveyors 407. The second pair of conveyors 407 features width measuring sensors, i.e., width sensors, seventh sensor 411*g* and eighth sensor 411*h*, that face opposite directions. Sensors 411*g* and 411*h* measure the width of packages as they travel up to a ninth sensor 411*i* on the second pair of conveyors 407. Alternatively, seventh sensor 411*g* and eighth sensor 411*h* are located overhead and face downwardly towards the conveyor to measure the width of the packages. Ninth sensor 411*i* is located at a first end of a belt of one of the second pair of conveyors 407.

Infeed table 401 may be used with a linear system of conveyors 413 having a first linear conveyor 415, a second linear conveyor 417, and a third linear conveyor 419. Infeed table 401 singulates packages from the hopper onto linear conveyors 413. First linear conveyor 415, featuring the main feed belt, is located up-stream from infeed table 401, and third linear conveyor 419 is located generally downstream of infeed table 401. Second linear conveyor 417 connects third linear conveyor 419 to first linear conveyor 415. First linear conveyor 415 is optional based upon whether there is an upstream parcel flow. First linear conveyor 415 and third linear conveyor 419 are optional.

Linear system of conveyors 413 further comprises a tenth sensor 411*j*, an eleventh sensor 411*k*, a twelfth sensor 411*l*, and a thirteenth sensor 411*m* located to detect jams. The tenth sensor 411*j* is located upstream, such that the distance from the sensor to the leading edge of 407 is larger than the belt width of 407. Tenth sensor 411*j* is an example of a position sensor and is located on a possible main feed belt 415 and enables the controller to determine a width of an opening along the conveyor system 413. Both the width of an opening on the main feed belt 415 and the width of the package measured on the second pair of conveyors 407 are sent to the controller. The controller uses these two widths along with additional package presence information provided by 411*l*, 411*k*, and 411*m* to decide whether to inject a package off of the second conveyor 407 and onto second linear conveyor 417. While only one side of infeed table 401 has been described, it should be apparent that the other side is similar in form and function as the described portion.

Figure 5:
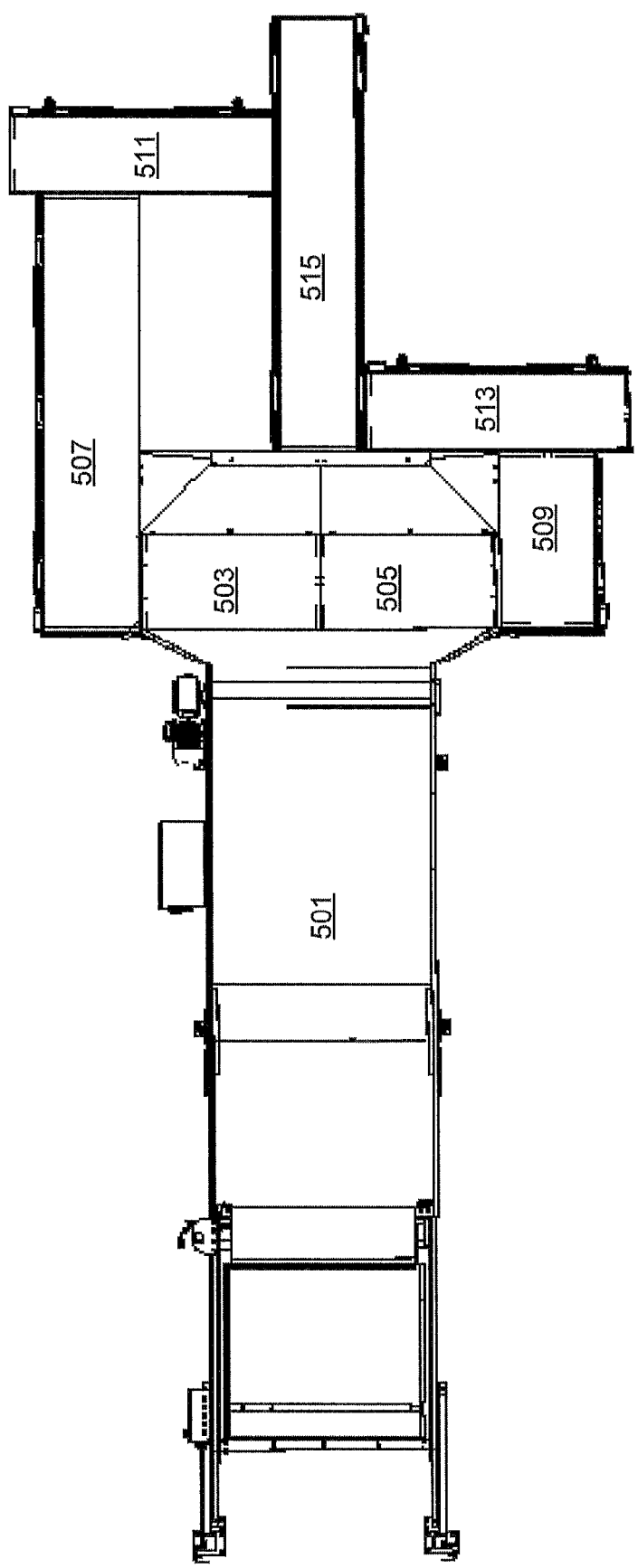
FIG. 5 is a top view of an infeed table of an automated parcel singulator with additional conveyors according to the present application.

FIG. 5 illustrates an alternative infeed table that utilizes four 90 degree turns. The first 90 degree turn is occurs when a package transitions from the hopper 501 to first pair of conveyors 503 and 505. The second 90 degree transition occurs when a package transitions from the first pair of belts 503 and 505 to the second pair of belts 507 and 509. In this depiction belt 507 is longer than 509, it should be apparent that these belts could be switched such that belt 507 is shorter then belt 509. Additionally, it should be apparent that another configuration of this design could have belts 507 and 509 be the same length. The third 90 degree turn occurs when a package transitions from the second pair of belts 507 and 509 to the third pair of belts 511 and 513. The fourth and final 90 degree transition occurs when a package transitions from the third pair of belts 511 and 513 to the infeed conveyor system 515.

Figure 6:
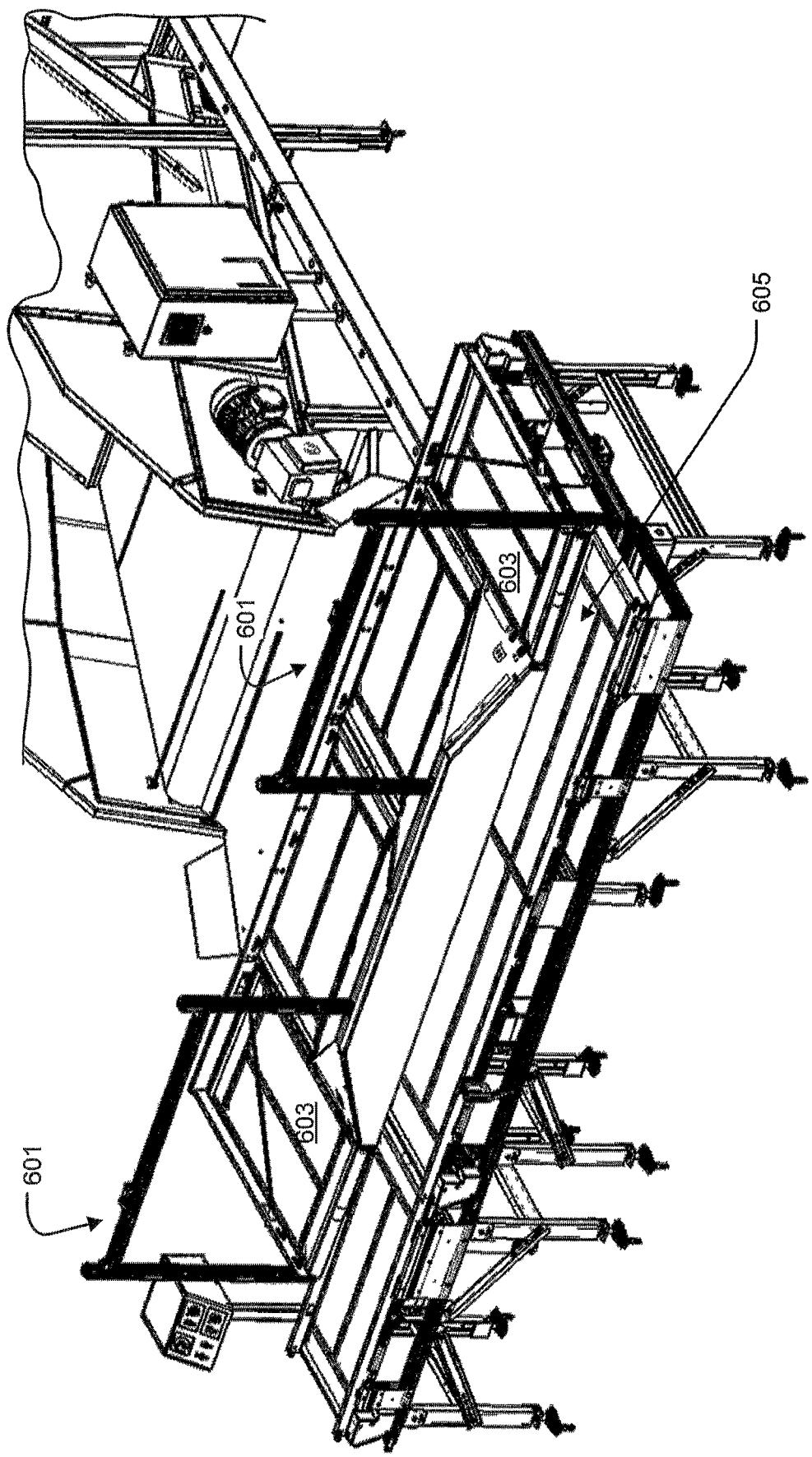
FIG. 6 is a partial perspective view of an infeed table of an automated parcel singulator illustrating sensor paths according to the present application.

FIG. 6 illustrates an alternative infeed table that is identical to FIG. 1 except that it utilizes an optical visualization system 601 at the interfaces of a pair of conveyors 603 and a infeed system 605. The optical visual system identifies package length, package width, and number packages as they travel down the second pair of conveyors. Additionally the optical visual system stages packages at the end of the second pair of conveyors for injection onto the infeed system. The lengths, widths and number of packages are sent to at least one controller that makes injection decisions.

Figure 7:
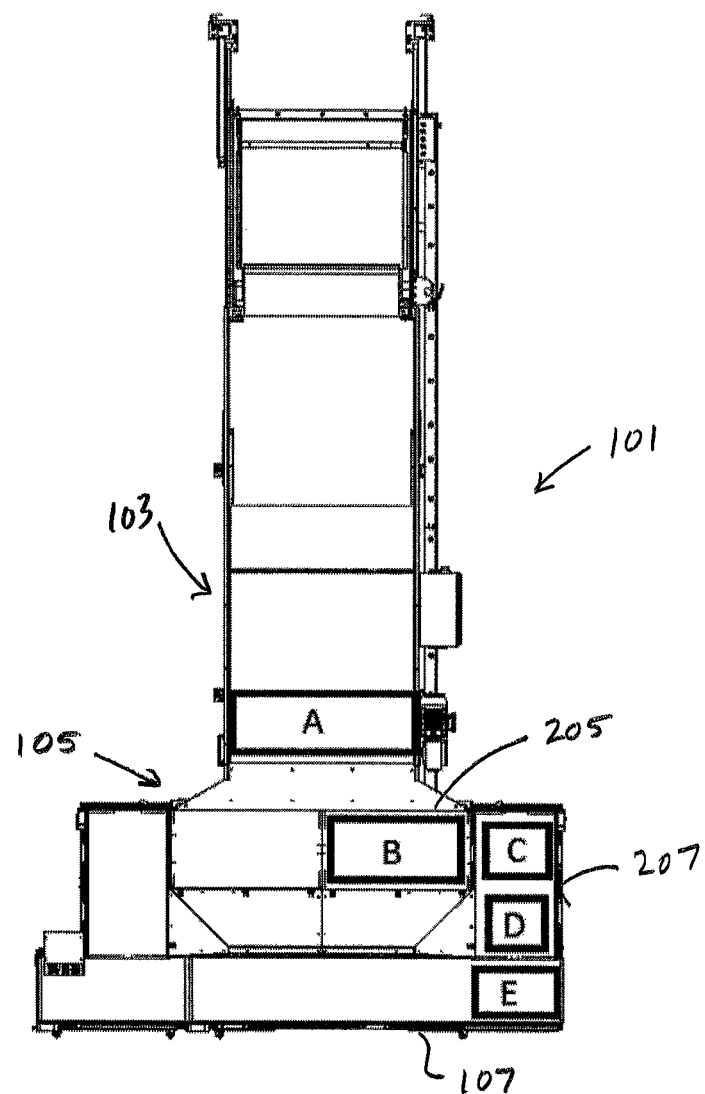
FIG. 7 is a schematic

Referring now to FIG. 7 in the drawings, a schematic depicting the various operational regions of automated parcel singulator is illustrated. The parcels typically travel through automated parcel singulator 101 in the following manner. Parcels travel along hopper system 103 until reaching region A, at which time, the controller is triggered to check and determine whether there are any parcels in region B. If there are parcels present in region B, then the controller stops hopper system 103, such that the parcels remain in region A. On the other hand, if region B is clear, the controller signals hopper system 103 to dump and/or transfer parcels from region A to region B. Once the parcels are at region B, the controller is triggered to check and determine whether there are any parcels at region C. If there are parcels present at region C, then the controller stops the first conveyor 205, such that the parcels remain in region B. On the other hand, if region C is clear, then the controller signals first conveyor 205 to transfer parcels onto region C on second conveyor 207. The controller then checks and determines whether there are any parcels at region D. If region D is clear the controller signals second conveyor 207 to advance the parcels until the parcels reach region D. As the parcels traverse from region C to region D the widths of the parcels are measured.

Additionally, as parcels travel down linear conveyor system 107, the gaps between the parcels, represented here as region E, are measured. The controller then compares the width of each parcel at region D with the widths of the gaps in region E. If the width of the parcel in region D is bigger than the available gaps in region E, then the controller will prevent second conveyor 207 from injecting the parcel onto linear conveyor system 107. On the other hand, if the width of the parcel in region D is are smaller than a particular gap in region E, the controller will cause the second conveyor to inject the parcel into that particular gap on linear conveyor system 107. It will be appreciated that this process is performed simultaneously on each side of infeed table 105. It should also be apparent that other parcel movements and belt movements may be used to optimize and improve the functionality of automated parcel singulator 101.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered, combined, and/or modified, and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms but is amenable to various changes and modifications without departing from the spirit thereof.

I claim:

1. An automated parcel singulator for selectively transferring parcels from a hopper system onto a linear conveyor system, the automated parcel singulator comprising:
    an infeed table comprising:
        a first conveyor disposed approximately perpendicular to the hopper system, the first conveyor being configured to receive the parcels from the hopper system; and
        a second conveyor disposed adjacent to and approximately perpendicular to the first conveyor, the second conveyor also being disposed adjacent to and approximately perpendicular to the linear conveyor system;
        wherein the first conveyor is configured to transfer the parcels from the hopper system to the second conveyor and the second conveyor is configured to selectively transfer the parcels from the first conveyor to the linear conveyor system;
    at least a first controller;
    at least one position sensor configured to determine a gap between parcels on the linear conveyor system and to relay such gap determination to the first controller; and
    at least one width sensor configured to determine the width of the parcels and to relay such width determination to the first controller as the parcels move along the first conveyor or the second conveyor, the width sensor being located so as to detect the width of the parcels while the parcels are at or upstream of an interface between the second conveyor and the linear conveyor system;
    wherein the parcels are selectively held on and transferred from the second conveyor onto the linear conveyor system into the gap between parcels, based upon the widths of the parcels on the second conveyor and the gaps between parcels moving along the linear conveyor system, as determined by the position sensor, the width sensor, and the first controller.

2. The automated parcel singulator according to claim 1, wherein the first conveyor is independently controllable and bi-directional to allow parcels to move both ways.

3. The automated parcel singulator according to claim 1, further comprising:
    a first sensor;
    a second sensor; and
    a third sensor;
    wherein the first sensor, the second sensor, and the third sensor are spaced along the first conveyor; and
    wherein the first controller utilizes the first sensor, the second sensor, and the third sensor to activate the first conveyor when a parcel is transferred from the hopper system onto the first conveyor.

4. The automated parcel singulator according to claim 3, further comprising:
    a corner sensor spanning from a first side of the second conveyor to an adjacent second side of the second conveyor;
    wherein the corner sensor is configured to inform the first controller whether a package is located in a first corner of the second conveyor.

5. The automated parcel singulator according to claim 4, further comprising:
    a first output sensor located near a third side of the second conveyor opposite the first side of the second conveyor;
    wherein the first output sensor provides the first controller with data when a package is ejected from an end of the second conveyor; and
    wherein the first output sensor is either an optical device or a pair of measuring sensors facing opposite directions.

6. The automated parcel singulator according to claim 1, wherein the infeed table further comprises:
    a wedge located between the first conveyor and the linear conveyor system.

7. The automated parcel singulator according to claim 1, wherein the first controller can determine when to eject a parcel onto the linear conveyor system based upon signals from the position sensor.

8. The automated parcel singulator according to claim 1, wherein a length of the first conveyor and a length of the second conveyor are each less than about 8 feet in length.

9. The automated parcel singulator according to claim 1, wherein at least one of the conveyors oscillates at a speed of the linear conveyor system.

10. The automated parcel singulator according to claim 5, wherein the first output sensor is elevated over the second conveyor and faces downward toward the second conveyor.

11. An automated parcel singulator for selectively transferring parcels from a hopper system onto a linear conveyor system, the automated parcel singulator comprising:
    an infeed table comprising:
        a first conveyor disposed approximately perpendicular to the hopper system, the first conveyor being configured to receive the parcels from the hopper system and transfer the parcels to the second conveyor;
        a second conveyor disposed approximately perpendicular to the first conveyor, the second conveyor being configured to selectively transfer the parcels from the first conveyor to the third conveyor, the second conveyor also being disposed approximately perpendicular to the third conveyor;
        a third conveyor disposed approximately perpendicular to the second conveyor, the third conveyor being configured to selectively transfer the parcels from the second conveyor to the linear conveyor system, the third conveyor also being disposed approximately perpendicular to the linear conveyor system;

at least a first controller;

at least one position sensor configured to determine a gap between parcels on the linear conveyor system and to relay such gap determination to the first controller; and at least one width sensor configured to determine the width of the parcels and to relay such width determination to the first controller as the parcels move along the first conveyor, the second conveyor, or the third conveyor, the width sensor being located so as to detect the width of the parcels while the parcels are at or upstream of an interface between the third conveyor and the linear conveyor system;

wherein the parcels are selectively held on and transferred from the third conveyor onto the linear conveyor system into the gap between the parcels, based upon the widths of the parcels on the third conveyor and the gaps between parcels moving along the linear conveyor system, as determined by the position sensor, the width sensor, and the first controller.

* * * * *